United States Patent [19]

Blevins et al.

[11] Patent Number: 5,071,932
[45] Date of Patent: Dec. 10, 1991

[54] BUTADIENE MONOEPOXIDE/MALEIC ANHYDRIDE COPOLYMERS

[75] Inventors: Richard W. Blevins, Rochester; S. Richard Turner, Pittsford, both of N.Y.

[73] Assignee: Eastman Kodak Company, Rochester, N.Y.

[21] Appl. No.: 680,451

[22] Filed: Apr. 4, 1991

Related U.S. Application Data

[62] Division of Ser. No. 498,183, Mar. 23, 1990, Pat. No. 5,013,806.

[51] Int. Cl.$^5$ ............................................. C08F 34/02
[52] U.S. Cl. ..................................... 526/271; 526/273
[58] Field of Search ................................. 526/271, 273

[56] References Cited

U.S. PATENT DOCUMENTS

| Re. 29,028 | 11/1976 | Katsimbas | 260/836 |
|---|---|---|---|
| 2,540,072 | 8/1948 | Hays | 526/271 |
| 2,570,601 | 10/1948 | Schmerling | 260/2 |
| 2,582,708 | 10/1948 | Lippencott et al. | 526/271 |
| 3,230,207 | 1/1966 | Dalmon et al. | 260/88.3 |
| 3,253,000 | 5/1966 | Kirchhof et al. | 526/271 |
| 3,530,103 | 9/1970 | Pitt | 260/79 |
| 3,851,015 | 11/1974 | Agouri et al. | 260/878 B |
| 3,944,533 | 3/1976 | Beck et al. | 260/93.1 |

OTHER PUBLICATIONS

N. Kaishi and N. Masato, Kobunshi Kagaku, 24, 272 (1967).

G. B. Butler et al., J. Macromol Sci. Chem. A5 (1) 219 (1971).

T. Sagusa Angew. Chemie. IE, 16, 826 (1977).

*Primary Examiner*—Joseph L. Schofer
*Assistant Examiner*—Alex H. Walker
*Attorney, Agent, or Firm*—Robert L. Walker

[57] ABSTRACT

Copolymers are produced when 3,4-epoxy-1-butene (EpB) is copolymerized with maleic anhydride. The copolymerization is initiated by free radicals, and comprises both 1,2-propagation and 1,5-propagation of EpB. When an ether is used as the reaction solvent, the product is soluble, and essentially composed of (a) a monomer derived from maleic anhydride, and (b) two monomers derived from EpB. When the reaction solvent is a ketone, the polymer product is also soluble, and additionally contains (c) a moiety derived from a dioxolane formed in situ. When the reaction is conducted in the presence of a non polar (e.g., hydrocarbon or a halocarbon) solvent, or neat (i.e., in the absence of a solvent), the polymer product is insoluble in common organic solvents and contains (d) a symmetrical EpB dimer. This dimer apparently does not form, or is formed to only a very slight extent, when the polymerization is conducted in polar reaction solvents. Polymer products with a dioxolane moiety can be made by using preformed dioxolane in the polymerization mixture. Thus, this invention is not limited to in situ preparation of the dioxolane from a reaction mixture containing a ketone. Products of this invention can be cast as clear films and can also be used as reactive polymers.

2 Claims, No Drawings

BUTADIENE MONOEPOXIDE/MALEIC ANHYDRIDE COPOLYMERS

CROSS REFERENCE APPLICATION

This application is a Division of Application Ser. No. 498,183, filed Mar. 23, 1990 now U.S. Pat. No. 5,013,806.

FIELD OF THE INVENTION

This invention relates to copolymers and to a process for their formation. More specifically, it relates to the production of copolymers from (i) a maleic anhydride and (ii) a difunctional monomer having an olefinic bond and an epoxide ring. Such a monomer is exemplified by 3,4-epoxy-1-butene, hereinafter sometimes referred to as "EpB" or "butadiene monoepoxide."

The process of this invention is a solvent-dependent copolymerization in which the product is derived in part by 1,2- and 1,5-propagation of the difunctional monomer. In other words, the difunctional monomer reacts in part via an opening of the epoxide ring, thereby contributing one moiety to the polymer product, and in part via a mechanism in which the ring is not opened, thereby contributing a second moiety to the product. Stated another way, the difunctional component contributes not one, but at least two chemically distinct groups to the product. If a ketone is used as a solvent in the process, a portion of the difunctional monomer reacts with the solvent and thereby contributes a third moiety (a dioxolane) to the product. If only two moieties from the difunctional monomer are desired, the reaction can be conducted in the presence of tetrahydrofuran, or a similar polar reaction solvent.

The moiety contributed by the ketone can be introduced into the polymer by using a preformed dioxolane.

The processes of this invention use a free radical initiator.

BACKGROUND OF THE INVENTION

It is known in the art that butadiene monoepoxide (EpB) and mixtures of EpB and vinyl compounds can be polymerized in a sealed system and at a temperature of 150°–350° C. Such a process is described in U.S. Pat. No. 2,570,601. It is stated that EpB polymerizes with itself to form a clear, yellow resin. The mixed resins are said to have low solubilities in organic solvents, particularly hydrocarbons, and are taught to be useful as surface coatings which are melted, and applied hot to the materials and articles being coated.

It is also known in the art that olefin oxides can be polymerized or copolymerized in the presence of an ionic catalyst, which comprises a dialkyl zinc and a metal oxide or hydroxide; U.S. Pat. No. 3,230,207. It is stated that the use of the metal oxide or hydroxide improves the yield of polymer, over that afforded by use of the alkyl zinc catalyst alone. The products are said to have a high degree of crystallization.

It is also known in the art that maleic anhydride can enter into various types of copolymerizations. For example, a 1:1 copolymer of allylglycidyl ether and maleic anhydride is described by N. Kaishi et al., in *Kobunshi Kagaku*, 24, 272 (1967). Also, it is known in the art that a cyclocopolymer can be prepared which has two maleic anhydride moieties per each divinyl ether group; G. B. Butler et al., *J. Macromol Sci: Chem.* A5 (1) 219 (1971).

As illustrated by the above cited art, it is known that EpB and maleic anhydride can be used individually as comonomers for polymerization with various substances. However, those references do not disclose that these two monomers can be copolymerized.

U.S. Pat. No. 3,851,015 discloses a process for producing block copolymers from monomers of different types, by polymerization in two successive steps. The first step comprises an anionic polymerization, and the second step comprises a free radical catalysis. It is stated that EpB is among the monomers which can be polymerized in the second step. The second step is conducted in the reaction mixture produced by the first step. The patent does not disclose means for copolymerizing maleic anhydride and EpB in one reaction.

Accordingly, it can be seen from the above that there is no art-recognized method for copolymerizing maleic anhydride and EpB in one step. The process of this invention provides a single step method for copolymerizing those substances; hence, it provides a significant advance over the art.

SUMMARY OF THE INVENTION

In one embodiment, this invention comprises a copolymer having repeating units of the formula:

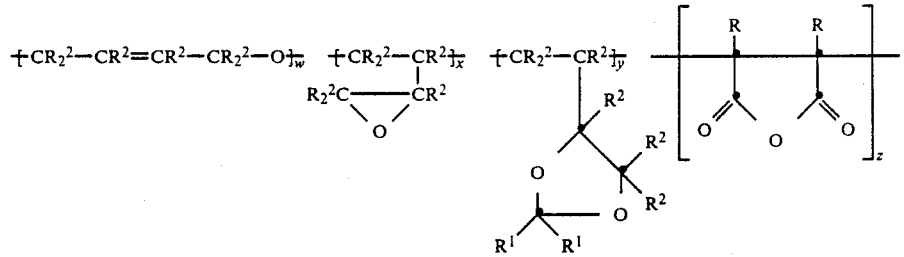

wherein each R is independently selected from hydrogen, cyano, halo, e.g., chloro or bromo, and lower primary or secondary alkyl groups of 1–4 carbons such that the sum of the carbon atoms in each repeating unit Z is up to about 12, and each $R^1$ is independently selected from alkyl and aryl radicals having up to about ten carbons or when taken together are a divalent alkylene or arylene radical having up to about 20 carbon atoms, each radical indicated by $R^2$ is hydrogen or an alkyl group having one to four carbon atoms, such that the total number of carbon atoms in $R^2$ groups in each repeating unit with an $R^2$ group is up to about 8, and (w+x+y) is equal to 1±0.2, z is equal to 1, and y is optionally equal to zero.

In another embodiment, this invention comprises a method for making the polymers described above. Thus, this second embodiment provides a copolymerization process which comprises 1,2- and 1,5-propagation of a butadiene monoepoxide reactant having up to about 12 carbon atoms, and 3,4-propagation of a maleic anhydride reactant having up to about 12 carbon atoms; said process comprising contacting said reactants in the presence of a free radical initiating amount of a free radical initiator, at a temperature at from about −10° C. to about 180° C. and in a reaction solvent selected from ethers, ketones and mixtures thereof, thereby forming a copolymer product soluble in such solvent.

In another embodiment, this invention provides a process for the preparation of a polymer of the type described above, said process comprising reacting a butadiene monoepoxide and a maleic anhydride, each having up to about 12 carbon atoms and a dioxolane having the formula

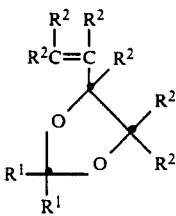

wherein $R^2$ is selected from hydrogen and alkyl groups having up to about 4 carbon atoms such that the total number of carbon atoms in $R^2$ groups is up to about 8, and each $R^1$ taken independently is an alkyl group or aryl group of up to about 12 carbon atoms, or when taken together are a divalent alkylene or arylene group of up to about 20 carbon atoms, said process being conducted in the presence of a free radical initiating amount of a free radical initiator, and at a temperature from about −10° C. to about 180° C.

In still another embodiment, this invention provides a polymer comprising chains of monomeric units linked by a bridging group, said chains having monomeric groups of a maleic anhydride reactant having up to about 12 carbon atoms, in alternating relationship with monomeric groups of a butadiene monoepoxide reactant having up to about 12 carbon atoms produced by 1,2- and 1,5-propagation of said monoepoxide; said bridging group being a dimer of said epoxide.

In a fifth embodiment, this invention provides a process for producing the cross-linked polymers. Thus, this invention provides a process comprising reacting anhydride reactant and a butadiene monoepoxide reactant, each having up to about 12 carbon atoms, in the presence of a free radical initiating quantity of a free radical initiator, and in the substantial absence of a polar solvent, at a temperature within the range of from −10° C. to about 180° C., said process being further characterized by being conducted in the presence of a non polar solvent, or in the absence of added solvent.

The processes of this invention do not require a sealed tube or pressure reactor, as taught in prior art noted above. Instead, the process of this invention can produce polymers at mild reaction temperatures, and at ambient pressures. Furthermore, the process of this invention can produce polymers which are soluble in organic solvents. Hence, materials of this invention need not be melted prior to using them as coating materials. Furthermore, the process of this invention avoids the problems associated with anionic polymerizations, or block polymerizations such as the storage requirements of organometallic catalysts. Moreover, the process of this invention produces polymers having unexpected structure and property characteristics.

The novel characteristics of this invention could not be predicted from the prior art. For example, it is believed that Applicants are the first to discover a free radical copolymerization product of EpB which contains units derived by both 1,2-propagation and 1,5-propagation. The formation of a dioxolane monomeric unit from EpB in situ is without precedent in the literature. Hence, the products and processes of this invention represent an advance over the state of the art.

With regard to utility, the copolymer products of this invention are useful as chemical intermediates for the preparation of other materials. The reactive anhydride, epoxide, and olefinic bonds in these copolymers can lead to crosslinking by a variety of materials to produce useful coatings, films, binders, and dispersing media for particulate materials. They can also be blended with other polymers to form coatings, films, pigment binders, etc.

DESCRIPTION OF PREFERRED EMBODIMENTS

This invention relates to polymers and to processes for their formation. The polymers are alternating copolymers derived from 3,4-epoxy-1-butene (EpB) and maleic anhydride, or from similar substances, i.e., analogs and homologs. The type of product produced is dependent upon the reaction conditions employed. In ethers, a 1:1 alternating copolymer is formed. It has a moiety derived from the anhydride, and also moieties derived by both 1,5-ring opening and 1,2-vinyl addition of the EpB monomer. In ketone solvents, cyclic dioxolanes are formed in situ, and incorporated in the copolymer. Cross-linking occurs in non polar solvents. All of the processes are initiated by free radicals.

Thus, this invention relates to novel compositions produced by novel processes which comprise contacting, as reactants, at least one butadiene monoepoxide reactant having the formula:

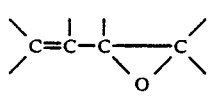

(I)

and at least one maleic anhydride reactant having the formula:

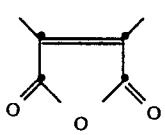

(II)

The unsatisfied valences in the formulas above bond the carbon atoms (from which the valences emanate) to hydrogen and/or other substituent(s) which do not interfere in the process of this invention. Some preferred substituents have already been mentioned.

In a more particular aspect, this invention is directed to copolymerization reactions in which there are 1,2- and 1,5-propagations of a butadiene monoepoxide reactant (Formula I). The copolymerization reactions are conducted using a maleic anhydride reactant (Formula II). More specifically, the maleic anhydride reactant copolymerizes with the butadiene monoepoxide reactant to yield a new type of product in which moieties from the anhydride and the epoxide alternate along the chain. The process can be conducted in the presence of an ether or ketone solvent.

In a highly preferred embodiment, this invention provides a copolymerization process which comprises 1,2-propagation and 1,5-propagation of 3,4-epoxy-1-butene and 3,4-propagation of maleic anhydride, said process comprising contacting said reactants in (i) the presence of a free radical initiating amount of a free radical initiator and (ii) a solvent selected from the class consisting of ethers and ketones, and at a temperature of from about 0° C. to about 150° C., to yield a copolymer product soluble in organic solvents. Products of this type of polymerization are also soluble in aqueous base or aqueous acid.

As taught above, the copolymerization solvent has an important effect on the yield and structure of the copolymers. Copolymerizations conducted in non polar solvents, e.g., toluene, chloroform, and dichloroethane (which are non-solvents for the final copolymer), and neat copolymerizations, yield copolymer products which are insoluble in organic solvents, if the copolymerization is continued more than about one or two hours at reaction temperatures. Soluble copolymers are formed in THF, but the workup of the copolymerization mixture may lead to oils when the copolymerization solutions are precipitated into non-solvents such as heptane.

Turning now to the products provided by this invention, proton and carbon NMR spectra demonstrate that soluble copolymers produced by the above-described process have a complex structure. For copolymerizations done in tetrahydrofuran, spectral evidence indicates that a combination of 1,5- and 1,2-propagation of the EpB with MAn leads to the product. This type of propagation, and the structure of the product produced, were entirely unexpected.

Coplymers formed in ketone solvents are more complicated and of an unexpected type. As discussed more fully below, such copolymers include a moiety derived from the dioxolane formed from EpB and the ketone used as the polymerization solvent. This dioxolane formation was also entirely unexpected.

Investigation by Applicants indicates that a dioxolane product is formed thermally in the presence or absence of a free radical initiator, and also in the presence of a free radical inhibitor. The dioxolane also forms from rigorously dried and purified starting materials. Although not bound by any theory, this evidence suggests that the maleic anhydride reactant may catalyze an addition reaction between the ketone and the EpB to form the dioxolane. However, at this time Applicants cannot rule out catalysis with a trace amount of maleic acid (a) either present in the anhydride, or (b) formed from a small amount of water which enters the reaction zone with the solvent or from some other source.

With further regard to the process, the copolymerizations of this invention are free radical in nature. They can be stopped with traditional free radical inhibitors such as cuprous chloride. No spontaneous or thermally induced copolymerization occurred in the absence of a free radical initiator. Conversion to the copolymer was found to be sensitive to the initiator concentration; however the molecular weight of the product was not. The latter is contrary to what is expected from classical free radical copolymerizations. However, for free radical copolymerizations of some other allylic monomers, similar results have been observed; T. Endo and K. Suga, J. Polym. Sci. Part A: Polym. Chem. Ed., 27 (1989) 1831.

The above-summarized results with free radical initiators and inhibitors effectively rule out polymerization via a zwitterion mechanism.

In preferred embodiments, this invention relates to copolymers having three or four chemically different units, depending on whether the preparative process is conducted in the presence of an ether (three component units or a ketone (4 component units). The copolymer products have two units or moieties produced from the 1,2- and 1,5-propagation of the olefinic-epoxy, i.e., butadiene monoepoxide, reactant. These units or moieties have the formulas:

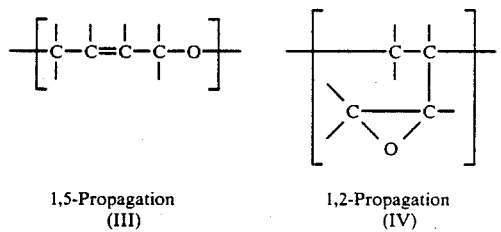

1,5-Propagation (III)      1,2-Propagation (IV)

In Formulas (III) and (IV), and (V) and (VI) below, the unsatisfied valences entirely within the brackets are satisfied by bonding to hydrogen and/or other inert substituent(s) which do not interfere with the process of this invention.

The third moiety or unit within the products of this invention has the formula:

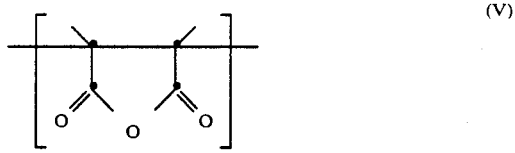

(V)

This unit is derived from the maleic anhydride reactant employed in the process. As can be seen from the formula, the moiety is derived by propagation involving the olefinic double bond in the anhydride. For the purpose of this invention, such propagation is termed "3,4-propagation."

A skilled practitioner will recognize that the anhydride structure in this moiety is easily hydrolyzed. Thus, it will be recognized that some or all of these moieties in the products of this invention may exist in hydrolyzed form, if water is introduced into the system containing the polymer, e.g., during product workup.

It has already been stated above that in another preferred embodiment, this invention comprises copolymers which are substantially insoluble in organic solvents. These copolymers are made by reacting a reactant of Formula (I) with a reactant of Formula (II) in the substantial absence of a polar solvent. To form these insoluble polymers, the copolymerization is conducted in the presence of a non polar solvent or neat, i.e., in the absence of added solvent. The reaction is conducted using a free radical initiator. When the polymerization is conducted in this manner, polymer moieties are cross-linked by a dimer formed by dimerization of the reactant of Formula (I).

The polymer moieties which are cross-linked contain two other units which are derived from the reactant of Formula (I), and another unit derived from the reactant of Formula (II).

The units derived from the reactant of Formula (I) do not homopolymerize. Similarly, moieties derived from the reactant of Formula (II) do not homopolymerize. Hence, the process of this invention proceeds by an alternating polymerization, and the units derived from each reactant alternate along the polymer chain in a fashion illustrated by

-A-D-A-D-A-D- wherein A is a unit derived from the anhydride and D is a unit derived from the reactant of Formula (I). As already indicated above and discussed more fully below, the units derived from Formula (I) reactant are not the same. Some are derived from 1,5-propagation and the others from 1,2-propagation.

Without being bound by any theory, we believe the units derived from the maleic anhydride reactant are relatively electron poor, i.e., electropositive, and that the units derived from the epoxyolefin reactant are electron rich, i.e., (weakly) electronegative, and that this explains the alternating arrangement of units in our polymers. It is to be noted, however, that there is no literature precedent indicating that the maleic anhydride reactant will interact with the relatively inert moieties from the epoxyolefin, especially under free radical conditions.

When a ketone is used in the process of this invention, the copolymer product of this invention has a fourth moiety or unit which is derived from the reaction product of the ketone and the epoxy reactant. This fourth moiety can be represented by the formula:

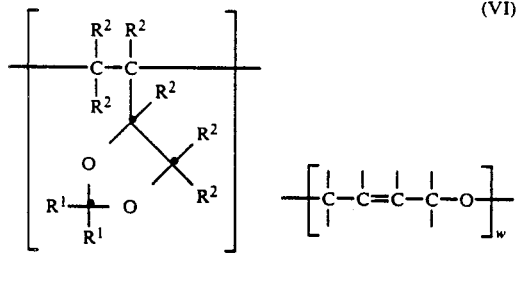
(VI)

in which the $R^1$ groups are alike or different, and are the groups in the ketone that are bonded to the carbonyl group, and $R^2$ is hydrogen or an alkyl group of 1–4 carbon atoms, such that the total number of carbon atoms in $R^2$ groups is up to about 8.

Thus, when a ketone is used as a reactant in the process of this invention, the monomeric starting material—which has the epoxy group—participates in formation of three units in the copolymer product. When the process is conducted in an ether in the absence of a ketone, the EpB or related compound is involved in the formation of two structural units within the polymeric product.

In Formula (VI), each $R^1$ can be alike or different depending on whether the ketone is symmetrical or unsymmetrical. If the ketone is a cyclic ketone such as cyclohexanone, the $R^1$ groups will not be separate groups. Instead, they together will be a 1,1-cyclo group, e.g., 1,1-cyclohexylidene. The $R^1$ groups are derived from ketones having up to about 20 carbon atoms. Such compounds have the formula $$R^1-\overset{O}{\underset{\parallel}{C}}-R^1$$

wherein each $R^1$ is alike or different. Preferably, $R^1$ is alkyl or aryl; more preferably, primary or secondary alkyl. It is most preferred that each $R^1$ be the same and selected from alkyl groups having up to about six carbon atoms. Straight chain alkyl groups of this type are highly preferred. In other preferred compounds, $R^1$ can be halosubstituted alkyl, more preferably perfluoromethyl. Other preferred ketones are mentioned later.

When $R^2$ in the dioxolane is an alkyl group, it preferably is a primary or secondary alkyl groups; most preferably, primary.

Preferred copolymers of this invention are 1:1 copolymers. In other words, products of this invention result from the chemical interaction of about one mole of EpB-type reactant, per each one mole portion of maleic anhydride reactant. As explained above, when an ether such as tetrahydrofuran is used as the reaction solvent and the below-described preferred reaction conditions are employed, the EpB-type reactant yields two types of units in the copolymer product. Hence, the sum of the moles of these two reactants will therefore be equal to the number of moles of maleic anhydride derived units present in the product. Thus, preferred products produced in an ether solvent will have the formula:

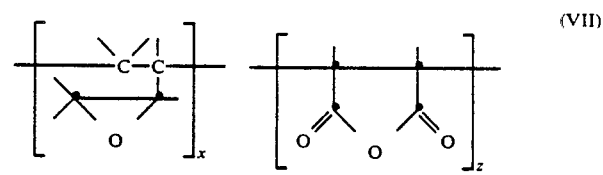
(VII)

wherein: $z=1$, and the sum of $w+x$ is equal to 1, or is substantially equal to 1, i.e., $1.0\pm0.2$. Thus $(w+x)$ is equal to $1\pm0.2$ when z is equal to 1. Each of w and x is a substantial fraction of 1.

Structural Formula (VII) should be considered to be a simplified illustration of the polymers produced by this invention. Stated another way, the polymers of this invention have some structural characteristics which are not portrayed by Formula (VII).

More specifically, the polymers illustrated by Formula (VII) are alternating in nature. Still more specifically, the moiety derived from the anhydride does not polymerize with itself, at least to an appreciable extent. Furthermore, the moieties derived from the epoxyolefin behave similarly, in that they do not directly polymerize with themselves (to an appreciable extent). Thus, along the polymer backbone, each moiety derived from the maleic anhydride reactant is bonded (on either side) to a moiety derived from the epoxy-substituted olefin by either 1,5- or 1,2-propagation. Similarly, each moiety from the butadiene monoepoxide reactant is bonded on either side to a moiety produced from the maleic anhydride reactant. Hence, if the moiety depicted by Formula (V) is labeled "A" and the moieties depicted by Formula (III) and Formula (IV) are labeled "D", then the polymers of this invention prepared in an ether solvent such as THF will have the formula:

A-D-A-D-A-D-  (VII-a)

wherein D is selected from the moieties depicted from Formulas (III) and (IV) such that when the moles of A are taken equal to 1, the number of moles of D are also equal to 1, and the moles of moieties from 1,5-propagation [Formula (III) and 1,2-propagation Formula (IV)] are each in the range of from about 0.1 to about 0.9 so that the sum of the moles from (III) and (IV) are equal to $1 \pm .02$. These same ratios generally occur in the insoluble materials of the invention prepared in non polar solvents or in the absence of a solvent. However, up to about 10 weight percent of the 1,5- and/or 1,2-propagation moieties are replaced by a bridging dimer of the type discussed later.

The range of values of w and x are suggested by NMR data. However, because of the complexity of the polymeric system, the determination of the values of w and x is difficult and not clear-cut. Hence, it is possible that in the future other analytical techniques (or a selection of appropriate reaction conditions) may demonstrate (or yield) polymers of this invention having w and x values somewhat outside of the ranges mentioned above.

When a ketone is used as a reaction solvent, the product of this invention has the formula:

lected reaction conditions may yield polymers having values of w, x, and y outside of the range.

The compositions of this invention which have been derived by reactions conducted in the presence of a ketone are similar to the products made using tetrahydrofuran or similar material as the reaction medium. Hence, the values of x, y, and z given above may be somewhat outside the ranges given above.

In general the molecular weight of the polymers of this invention is from about 500 to about 20,000. Using the reaction product of 3,4-epoxy-1-butene and maleic anhydride as an example, preferred products of this invention have the general formula $[EpB).(MAn)]_t$ wherein the value of t is from one to about 200; more preferably from one to about 50. Similar products can be derived from reactants related to EpB and MAn. In other words, for products derived from reactants in which one or more of the hydrogens in maleic anhydride and/or EpB is substituted with other inert substituent(s), the value of t will generally be within the same ranges given above.

It is to be understood that the molecular weight range given above is for the soluble polymers of this invention. As appreciated by a skilled practitioner, it is very difficult to measure the molecular weight of insoluble materials. Accordingly, the molecular weight of the polymers of this invention produced in a non polar solvent or in the absence of a solvent has not been determined. In view of the cross-linked nature of those materials, it is believed that the molecular weights of at least some of the products may be higher than reported above. In other words, some insoluble products may have molecular weights within the above range; other insoluble products may have a higher molecular weight.

It is to be understood that Formula (VIII) is an oversimplification, just like Formula (VII). In other words,

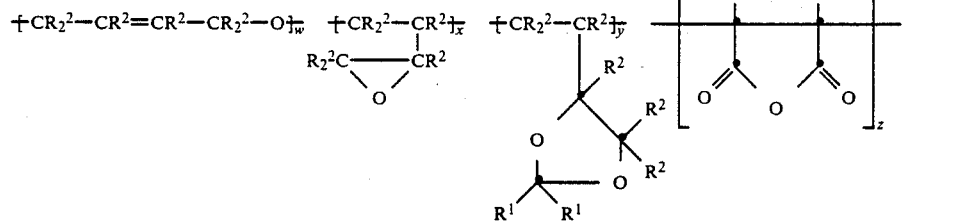

(VIII)

wherein R, $R^1$, and $R^2$ are as described above.

As can be seen, this type of product has a fourth structural component; viz, the moiety derived from the dioxolane formed by reaction of the ketone with the epoxide.

Preferred products of type VIII are also 1:1 copolymers, that is, for each one mole portion of the maleic anhydride unit, there is a total of one mole portion of moieties derived from the EpB type reactant. In other words, in the above formula "Z" is equal to one, and the sum $(w+x+y)$ is equal to one. Each of w, x, and y is a substantial fraction of one, i.e., (1.0). In general, the value (when z is one) of w is from about 0.1 to about 0.9, the value of x is from about 0.1 to about 0.9, and the value of y is from about 0.1 to about 0.9 such that, as mentioned above $(w+x+y) = 1 \pm 0.2$. Again, the determination of these values is difficult. Thus, as with polymers formed in an ether solvent (a) other analytical techniques may demonstrate that the values of w, x, and y are somewhat outside this range; and similarly, sethe materials of Formula (VIII) are alternating polymers. Using "A" again to represent a moiety of FIG. (V), and "D" again to represent a moiety selected from the class consisting of moieties of FIGS. (III), (IV), and (VI), the polymers of FIG. (VIII) have the formula -A-D-A-D-A-D-, such that when the mole quantity of A is taken to equal 1, the sum of the moles of moieties from FIGS. (III), (IV), and (VI) is also equal to $1 \pm 0.2$, such that the values of w, x, and y in FIG. (VIII) are as described above.

As indicated in Formulas (I) and (II) above, a variety of butadiene monoepoxide reactants and maleic anhydride reactants can be employed in the process of this invention. Stated another way, the reactants used in this invention have the structural characteristics illustrated by Formulas (I) and (II). The unsatisfied valences in the formulas bond the carbon atoms (from which said valences emanate) to hydrogen or other "inert" substituent group(s). For the purpose of this invention, substituents are "inert" when they (a) do not decompose under the reaction conditions employed, or undergo any side reaction(s) to give an untoward amount of undesirable by-product;

(b) do not substantially interfere with the process of this invention by steric hindrance or other mechanism; and (c) do not poison the free radical initiator so that reaction initiation does not take place.

Hydrogen and alkyl groups are examples of these types of substituents. Preferred alkyl groups are "lower" alkyl groups, i.e., groups having up to about 4 carbon atoms. Preferably, the alkyl groups are devoid of tertiary carbons, i.e., carbon atoms that are bonded to three other carbon atoms. In preferred embodiments, the butadiene monoepoxide (I) and the maleic anhydride (II) have up to about 12 carbon atoms. Such starting materials are preferred because they in general are more readily available. However, reactants which have more than 12 carbon atoms can be used, so long as the substituents are "inert" as defined above. Highly preferred inert substituents (other than hydrogen) are methyl, chloro, and cyano. By way of illustration analogues or derivatives of maleic anhydride having the formulas:

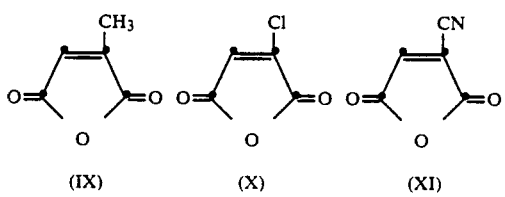

and the like, can be used as reactants.

As stated above, the preferred polymers of this invention are "1 to 1" copolymers. It is not necessary that the reactants be added to the reaction zone in this ratio; an excess of either reactant can be employed. There is no real upper limit on the amount of excess employed; this being defined by such secondary considerations as size of the reaction vessel, cost of the reactants, ease of separation of starting materials from products, etc. In general, one uses from about 0.5 to about 5.0 moles of one reactant per mole of the other. As an example, good results have been achieved when the butadiene monoepoxide is employed in molar excess, e.g., about 2 moles per each about 1.0 mole portion of maleic anhydride reactant; however greater or lesser amounts of either reactant can be used, if desired. However, it is to be understood that the composition of the polymer product is relatively insensitive to the ratio of reactants in the feed composition.

The process is conducted in the presence of a free radical initiator. In general, one employs a free radical initiator of the type known in the art such as azobisisobutyronitrile (AIBN), a benzoyl peroxide, hydrogen peroxide, butyl peroxide, and the like. The process can also be conducted in the presence of an amount of a redox initiator such as benzoyl peroxide and N,N-diethylaniline which is sufficient to initiate the reaction.

The amount of initiator employed is not critical. One employs enough initiator to achieve the desired result. Generally speaking, the amount of free radical initiator is from about 0.1 to about 10 weight percent based on the amount of butadiene monoepoxide. More or less initiator can be used, if desired. A skilled practitioner can readily determine whether an amount of free radical (or redox) initiator is adequate by adding the amount of initiator under investigation and determining by experimentation whether initiation occurs as desired.

If a redox initiator is used, a reaction temperature somewhat below the temperature used with free radical initiation may be desired. Thus, for example, redox initiators can be employed at room temperature or below.

The process of this invention is conducted in the presence of a solvent. It is preferred that the solvent boil at or above the initiation temperature. Thus, when AIBN or a peroxide is used as an initiator, the solvent preferably has a boiling point of about 40° C. or higher; more preferably about 60° or above. When an ether is used as a solvent, one generally uses a monodentate, bidentate or tridentate ether having up to about eight carbon atoms, and which has sufficient solvent power for the reactants and initiator, and which has a boiling point above the initiation temperature. For the purpose of this invention, ethers having one, two, or three ether linkages are designated respectively, monodentate, bidentate and tridentate ethers. Examples of such ethers are tetrahydrofuran, 1,4-dioxane, dimethoxyethane, diethyleneglycol dimethyl ether, and the like.

Ketones for use in this invention are preferably selected from ketones which have sufficient solvent power for the reactants and initiator, and also have a boiling point above the initiation temperature. Examples of suitable ketones are cyclic and acyclic ketones having three to about 20 carbon atoms such as acetone, 2-butanone, hexafluoroacetone, cyclohexanone and the like.

The concentration of reactants in the solvents is preferably in the 15-95 weight percent range; however it is to be understood that reactant concentrations somewhat outside this range can be used if desired. A preferred concentration of monomers range is usually from about 25-50 weight percent. It is to be recognized that a skilled practitioner may wish to operate outside the ranges given above. For example, an operator may wish to use the minimum amount of solvent necessary to inhibit cross-linking, in order to improve process economics. If this minimum is outside the above ranges, the preferred solvent amount, at least from an economic viewpoint, will be outside the ranges given above. Hence, the above ranges are not critical.

The process is started and conducted at convenient reaction temperatures which provide initiation of the reaction and a reasonable reaction rate. More than one temperature can be used. Thus, for example, the process can be initiated at one temperature and conducted at another temperature, or at several temperatures. In general, when free radical initiation is employed, the process is initiated and conducted at temperatures between about −10° C. to about 180° C. When a redox initiator is used the reaction is usually (a) initiated at a temperature of from about −10° to about 25° C., and (b) conducted at a temperature in the range of from about −10° to about 25° C.

All of the materials used can be admixed prior to reaction. Alternatively, one may use a programmed addition of one or more materials to the reaction mass.

The process proceeds well at ambient pressure. Thus, use of atmospheric pressure is preferred. However, subatmospheric and superatmospheric pressures can be used if desired. Superatmospheric pressures may be preferably selected when a high temperature initiator is employed, or one or both of the reactants boil at a temperature below the selected reaction temperature.

The reaction time is not a truly independent variable, but is dependent at least to some extent on the inherent reactivity of the reactants, the reaction temperature employed, the conversion rate desired, etc. In general, process times in the range of from about 1 to abut 36 hours. Times within the range of from about 4 to about 24 hours are preferred.

Representative polymerizations of 3,4-epoxy 1-butene (EpB) and maleic anhydride (MAn) follow:

EXAMPLE 1

A clean Claisen bottle was filled with 66.0 g reagent grade cyclohexanone, 14.02 g (0.2 mole) EpB, 14 g (0.143 mole) MAn, 0.657 g AIBN (4 mmole, 2% molar to EpB), and a magnetic stir bar. The copolymerization solution was sparged with dry Argon for 10 minutes and the bottle was crimp-sealed. The bottle was placed in an oil bath at 70° C. and heated with stirring for 24 hours. After cooling, the polymer bottle was opened, the reaction solution was diluted with 30 ml additional cyclohexanone, and then precipitated into rapidly stirred heptane. The solid polymer was redissolved in dry THF, reprecipitated into ethyl ether (to remove unreacted MAn), and collected using suction filtration. The yield was 18.2 g (65% theory) based on monomer weights. SEC gave Mw=1350, Mn=911. An Inherent viscosity of 0.04 (0.5 g/dl) in THF was found.

Copolymers produced in this manner were usually characterized by IR and both $^1$H and $^{13}$C NMR. The IR spectra (film from THF on AgCl disk) showed characteristic bands at 3600–3100 cm$^{-1}$ (b, OH); 1835, 1780 cm$^{-1}$ (b, s, anhydride C=O); 1725 cm$^{-1}$ (b, s, acid C=O), and 1640 cm$^{-1}$ (b, s, acid OH).

EXAMPLE 2

A polymerization bottle was charged with 7.0 g (0.1 mol) of EpB, 9.8 g (0.1 mol) of maleic anhydride, 50 g of 2-butanone, and 0.328 g (2 mol %) of AIBN. A magnetic stir bar was added, and the solution was sparged with argon, and sealed and then heated in an oil bath at 65° C. for 18 hours. 10 g of copolymer (59.5%) were obtained by precipitation into heptane. The SEC gave Mw=2030 and Mn=990. The $^1$H and $^{13}$C NMR spectra clearly showed the copolymer to consist of w, x, and y units as depicted above in approximately equal ratio with z. In other words, the number of z units was equal to the total of (w+x+y) units. The y unit was the dioxolane formed from EpB and 2-butanone. The w and x units were the units derived by 1,2- and 1,5-propagation of EpB. The z unit was the unit derived by 3,4-propagation of the maleic anhydride.

3,4-Epoxy-1-butene used in these experiments was obtained from a unit of Eastman Kodak Company and was fractionally distilled at 65°–66° C. to obtain a sample of 99.97% purity by GC/MS.

Maleic anhydride was recrystallized from chloroform and sublimed.

Azobisisobutyronitrile (AIBN) was recrystallized from methanol.

All solvents were dried and distilled prior to use. The reagents were kept at room temperature under nitrogen in a dry glove box.

Small-scale copolymerizations used in our experiments (1–5 g) were done in crimp-sealed polymerization bottles with all charging and sealing operations done in the dry box. Small magnetic stir bars were used for agitation. Larger scale copolymerizations (10–25 g) were also done in crimp-top bottles with the reaction solution sparged for 1–10 minutes with Argon prior to crimp sealing the bottle. Copolymerization reactors were magnetically stirred and heated in an oil bath at the stated temperature. After reaction, the reaction solutions were precipitated into hexane, and the polymer product recovered by filtration. The copolymer was redissolved in THF and reprecipitated into ethyl ether, filtered, and dried to obtain an off-white to slightly yellow powder.

The copolymer compositions were determined by titration. In a typical titration the polymer sample was dissolved in 5 ml of THF, and then 5 ml of aqueous 0.17M NaOH was added to cause complete hydrolysis of the anhydride units. The sample was stirred for 16 hours in a capped vial, and then residual NaOH was determined by titration with HCl. The consumer NaOH provided the measure of the total acid content.

Polymer molecular weights were determined by size exclusion chromatography (SEC) in THF using three 500 Angstrom nominal pore ultrastyragel columns which were calibrated with polystyrene standards.

COPOLYMERIZATION CONDITIONS

We studied the copolymerization of EpB/MAn as illustrated in the Examples, under a variety of copolymerization conditions including solvent, initiator, and concentration of initiator, comonomer concentration and feed ratio, reaction time, and reaction temperature. The results are summarized in Table 1.

As already stated, the copolymerization solvent had an unexpected and important effect on the yield and structure of the copolymers. Copolymerizations in toluene, chloroform, dichloroethane (non-solvents for the final copolymer), and neat copolymerizations all yielded insoluble (in organic solvents) copolymer products if continued more than one or two hours at appropriate temperatures. Soluble copolymer was formed in THF, but the workup of the product often led to oils when the copolymerization solutions were precipitated into non-solvents such as heptane. Copolymerizations done in ketone solvents such as 2-butanone, cyclohexanone, or acetone and precipitated into heptane produced good yields of solid, powdery copolymer products. The concentration of monomers in the solvents varied, but most of the reactions were in the 25–50% range (by weight).

As already noted, copolymerization was found to be free radical in nature, and could be shut down with traditional free radical inhibitors such as cuprous chloride. Both AIBN and benzoyl peroxide were found to be effective initiators, with conversion increasing with time in the expected manner for free radical polymerizations. No spontaneous or thermally induced copolymerization occurred in the absence of free radical initiator. The conversion of the copolymer was sensitive to the initiator concentration; however, the molecular weight of the product was not. As would be expected for such a process, the yields increased with temperature (50°–75° C.) since the effective free radical concentration is higher. The highest conversion polymers and the most easily worked up polymerizations were those done in ketone solvents. A 3% loading of AIBN in cyclohexanone, with a 25% monomer charge gave a 100% yield of copolymer (based on monomer charge) when the reaction was done at 70° C. for 24 hours.

TABLE I

COPOLYMERIZATION RESULTS

| EXAMPLE | REFERENCE | SOLVENT | CONDITIONS | COMMENTS |
|---|---|---|---|---|
| 3 | 82A | Toluene | 1:1, 80° C., 1 mol % AIBN 50% solids, 4 hrs. | White solid soluble only in aqueous NaOH |
| 4 | 82B | Toluene | Same as 82A. no AIBN | No pzn.* observed |
| 5 | 83 | Toluene | Same as 82A but 25% solids, 60° C. | Solution became hazy, no polymer isolated |
| 6 | 85A | Toluene | Same as 82 A but 60° C. | Same as 82A |
| 7 | 119A | THF | Same as 82A, 70° C., 24 hrs. | Difficult to isolate solid. $M_n = 2590$ $M_w = 3950$ (large pore columns) |
| 8 | 121A | THF | Same as 119A with 2 mol % AIBN | Pzn. appears as viscous yellow liquid |
| 9 | 121B | THF | Same as 121A, with 75% solids | Pzn. appears as bubble filled solid |
| 10 | 128A | Toluene | 1:1, 70° C., 1 mol % AIBN, 25% solids, 24 hrs. | Insoluble product, 70% yield |
| 11 | 128B | THF | Same as 128A | Hard to isolate oil |
| 12 | 128C | Xylene | Same as 128A | Insoluble product, 54% yield |
| 13 | 128D | Dichloroethane | Same as 128A | Insoluble product, 65% yield |
| 14 | 128E | Cyclohexanone | Same as 128A | White powder, 65% yield |
| 15 | 131A | Cyclohexanone | 1:1, 70° C., 0.33% AIBN, 25% solids, 24 hrs. | White powder, 54% |
| 16 | 131B | Cyclohexanone | Same as 131A with 3% AIBN | White powder. 100% |
| 17 | 132C | Cyclohexanone | 1:1, 70° C., no AIBN, 24 hrs. | Small amt. of brown oil |
| 18 | 132D | Dichloroethane | Same as 132°C. | Small amt. of brown oil |
| 19 | 135 | 2-Butanone | 1:1, 65° C., 2 mol % AIBN, 25% solid | White solid. 60% yield, $M_n = 990$, $M_w = 2,030$ |
| 20 | 173A | 2-Butanone | 2:1 (I/II), 70° C., 2 mol % AIBN, 24 hrs. | White solid, 78% yield. |
| 21 | 173B | 2-Butanone | Same as 173A, no AIBN | No polymer |
| 22 | 173C | 2-Butanone | Same as 173A with 1 mol % of 3-t-butyl-4-hydroxy-5-methylphenyl-sulfide | No polymer |
| 23 | 173D | 2-Butanone | Same as 173A with 1 mol % of cuprous chloride | No polymer |
| 24 | 186A | Anisole | 1:1, 70° C., 28 hrs., 2 mol % AIBN 33% solids | 42% yield |
| 25 | 186B | 1,2-dimethoxy-ethane | Same as 186A | 45% yield |

*"pzn." = "polymerization".

Combustion analysis proved to be of marginal value in determining the composition of the copolymer products because the hydroscopic copolymer reacted readily with ambient water to open the succinic anhydride groups to the carboxylic acids. The results were thus inconsistent and irreproducible. Titration studies, as described above, were found to be valuable in determining the copolymer compositions. For the copolymerizations in ketone solvents the composition was found to be greater than 1:1 molar (EpB/MAn) over varying comonomer feed ratios with slightly higher apparent EpB values at higher EpB feed ratios.

Comparing the titration results with the NMR results shows that these copolymers have a 1:1 composition (w+x+y=1/z=1) as discussed above. The ratio of w+x to y depends on the feed composition and solvent used. Since no homopolymerization of these monomers was noted, these copolymers are alternating in their microstructure sequence.

Our study of the copolymerization conditions effectively rules out any zwitterionic process, since the copolymerization conversion was clearly related to the concentration of free radicals in the reaction. In addition, free radical inhibitors shut the copolymerization down completely (Table 1) and almost no product was observed in the absence of the free radical initiator.

The $^1$H and $^{13}$C NMR spectra reveal that the copolymer structures are dependent on the copolymerization solvent. The notable resonances for structure identification in the $^1$H are at $\delta 5.2-5.9$ which are unsaturated protons and the weak resonance at $\delta 2.4-3.4$ which arises from some residual protons of the epoxide functions. These are shifted slightly down field from the resonances for the epoxy protons in EpB. The $^{13}$C spectrum also shows the presence of unsaturated carbons (126–138 ppm), carbons on the epoxide (45 and 52 ppm), and a broad carbonyl resonance (170–180 ppm). The broadness of the carbonyl region arises from several factors. First, a portion of the anhydride is opened to succinic acid. These succinic carbons can be in several different chemical environments depending on whether they are adjacent to a 1,5-polymerized unit or an unopened epoxide unit. The structure is further complicated in that the 1,5-addition appears to yield a mixture of cis and trans double bonds at $\delta 5.2$ and $\delta 5.7$, respectively. Thus, for copolymerizations done in THF, the evidence is strong that both 1,5- and 1,2-propagation of the EpB with MAn leads to the oligomer product.

The copolymer formed in ketone solvents was more complicated and the structure was unexpected. In an attempt to establish the copolymer composition by following the disappearance of MAn and EpB by NMR, a copolymerization carried out in an NMR tube showed the disappearance of the epoxide function, the formation of a new vinyl function, and the appearance of new, sharp resonances of a small molecule reaction product. Subsequent NMR analyses identified this small molecule as the dioxolane addition product of the ketone and EpB. We then followed several polymerizations of EpB/MAn by GC and observed the appearance of new GC peaks that were dependent on the ketone solvent used for the copolymerization. A GC/MS analysis of these peaks showed that they were the dioxolane of the corresponding ketone used as the polymerization solvent. For example, for 2-butanone the product is 2-ethyl-2-methyl-4-vinyl dioxolane. This product also was observed when rigorous drying conditions were used for the reactants and solvents. For example, the MAn was recrystallized and sublimed in a dry box to remove any residual maleic acid. This dioxolane formed both thermally in the absence and in the presence of the free radical initiator and thermally when a free radical inhibitor was present. We believe that it results from the acid catalyzed addition of the ketone to the EpB and not from some unprecedented free radical cyclization. The fact that it forms with rigorously dried and purified starting materials at first suggested to us that maleic anhydride may act as an "organic acid" and catalyze the addition reaction. We therefore believe that a small amount of maleic acid remains in the maleic anhydride or that a small amount of water in the reaction solvent forms some maleic acid which catalyzes the adduct formation.

Copolymerization of the EpB/MAn comonomer pair in 2-butanone leads to incorporation of this "in situ" formed adduct into the copolymer backbone. This is visible in the NMR spectra. The presence of the vinyl protons in the spectrum are indicative of 1,5-propagation, while the resonances at δ0.9-1.8 are consistent with the incorporation of some of the dioxolane adduct.

With regard to the origin of the cross-linking in the non polar solvents such as toluene, etc., and when the copolymerization is done neat, we have studied the neat copolymerization by GC/MS and observed a GC peak which we identified as an EpB dimer. We believe the most likely structure is the symmetrical EpB dimer.

(XII)

This is believed to form from an acid catalyzed EpB reaction as in the ketone cases. In ether solvents it appears that the acid is complexed and does not lead to these kinds of reactions. We believe that the presence of this dimer with its two double bonds leads to the cross-linked polymers. It does not form in the polar solvents that have been studied.

Similar dimers can be derived from butadiene monoxides having R² groups discussed above. The R² groups will appear on the carbons in the cyclic structure, as apparent to a skilled practitioner.

The polymers prepared in ether or ketone solvents were soluble in a number of organic solvents including methanol, ethanol, isopropanol, acetone, 2-butanone, tetrahydrofuran, cyclohexanone, dioxane, anisole, 1,2-diethoxyethane, pyridine, dimethylacetamide, nitrobenzene, dimethylformamide, dimethylsulfoxide, 5% aqueous NaOH, and 5% aqueous HCl. The copolymers were found to be insoluble in heptane, toluene, ligroin, diethyl ether, diphenyl ether, t-butyl ether, dichloromethane, chloroform, 1,2-dichloroethane, chlorobenzene, 1,1,2-trichloroethane, ethyl acetate, morpholine, acetonitrile, and water. The cross-linked polymers prepared in non polar solvents or prepared neat were soluble only in aqueous base and aqueous acid solution.

We were unable to detect a glass transition temperature in copolymers prepared in THF or in ketone solvents. A thermal gravimetric analysis was obtained on a copolymer prepared in THF. The polymer decomposed around 200° C. when heated in nitrogen at 10° per minute.

The following Example illustrates formation of the polymers of this invention using a preformed dioxolane. The dioxolane used in the Example is the adduct of EpB and 2-butanone. Other dioxolanes made from EpB and the ketones mentioned above can be reacted in a manner similar to that disclosed in the following Example.

EXAMPLE 26

In a dry glove box under an inert atmosphere, vinyl dioxolane, 1.42 g, 10 mmol; EpB, 0.7 g, 10 mmol; 0.033 g AIBN (2 mol % based on EpB); and maleic anhydride, 1.96 g, 20 mmol; were combined with 4.32 g dry tetrahydrofuran (THF) in a Claisen bottle with a magnetic stirrer, and sealed. They were then heated with stirring in an oil bath at 70°-80° C. for 20 hours. The product solution was diluted with 5 g THF and precipitated into 200 ml heptane. The product was filtered, redissolved in dry THF, and reprecipitated as a powder. The NMR spectrum of the product of this reaction was substantially identical to the spectrum of maleic anhydride and EpB polymerized in 2-butanone. Yield=2.83 g (69% theory).

As illustrated by the above Example, products of this invention which contain the dioxolane can be made using about an equimolar amount of the dioxolane and the epoxyolefin reactant. It is to be understood, however, that the reaction is not dependent upon the use of this mole ratio, and the ratio of dioxolane to the epoxyolefin can be more or less depending on the amount of dioxolane-derived moiety that the operator wishes to have in the final product. In general, the mole ratio of dioxolane to EpB is in the range of from about 0.5 to about 5.0 moles of dioxolane per each mole of EpB. With regard to the amount of maleic anhydride reactant, the operator will keep in mind the nature of the polymers of this invention, viz, that the moles of monomeric units derived from the maleic anhydride is about equal to the moles of monomeric units derived from the other reactant(s). When a dioxolane reactant is used, the reaction temperature, pressure, and time are in the ranges discussed above.

The processes of the invention illustrated by the above Examples using polar solvents can be used to prepare polymers illustrated by FIGS. (VII) and (VIII) above. Stated another way, they can be used to prepare polymers of FIG. (VIII) wherein y is zero or a positive number. In a preferred embodiment, the products of this invention have monomeric units derived from maleic anhydride, or a maleic anhydride analog wherein the 3-carbon is substituted by a halogen (preferably chlorine), cyano, or methyl. Similar products can be obtained when both the 3- and the 4-carbons of maleic anhydride are substituted with these groups. As indicated above, preferred materials made by the methods illustrated by the above Examples have compositions wherein the subscripts w and x in FIG. (VII) and w, x, and y in FIG. (VIII) each has a value of from about 0.05 to about 0.95.

When the product has Formula (VIII), that is, it contains a dioxolane unit, it is highly preferred that the dioxolane be derived from a ketone having the formula

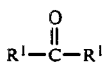

wherein one $R^1$ is methyl and the other is an alkyl group of one to six carbon atoms. In another highly preferred embodiment, it is preferred that the dioxane be derived from cyclohexanone; in other words, both $R^1$ groups taken together form the 1,1-cyclohexylidene radical.

Preferred soluble products produced by the methods of this invention have a molecular weight of from about 500 to about 20,000. As already indicated, however, products of this invention can have a molecular weight outside of this range; for example, the products made in a non polar reaction solvent or in the substantial absence of a solvent, i.e., in the absence of added solvent, or neat, can have a molecular weight outside of this range.

The processes of this invention illustrated by the above Examples are preferably conducted at a reaction temperature of from about $-10°$ to about $180°$ C.

As shown by Example 26, the process of this invention can be extended to produce products of Formula (VIII) as described above by use of a preformed dioxolane as a reactant. In other words, instead of using a ketone in the reaction mixture to form the dioxolane in situ, all or part of the ketone can be substituted with the preformed dioxolane. In a preferred embodiment, the process using the dioxolane is conducted in the substantial absence of added ketone. It is not necessary to rigorously exclude ketones from the reaction zone. For example, some ketone can be intentionally added, or it can be introduced with a dioxolane as an impurity or a diluent.

When the preformed dioxolane is used, the reaction conditions employed are generally the same as previously described. Thus, for example, one may use a temperature, pressure, reaction time, free radical initiator, and polar solvent (such as an ether) as described above. For each one mole portion of maleic anhydride reactant, it is preferred to use a molar excess of a mixture of butadiene monoepoxide and the dioxolane. In other words, the total amount of butadiene monoepoxide and preformed dioxolane should be more than one mole per mole of maleic anhydride reactant. In general, one employs from about 0.05 to about 0.95 mole each of the dioxolane and of the EpB so that a total of about one to two moles of (dioxolane plus butadiene monoepoxide) is employed per each mole of maleic anhydride reactant. The products formed by use of this expedient are illustrated by Formula (VIII) above.

As illustrated by Examples in the Table above, one embodiment of this invention comprises conducting the reaction of a butadiene monoepoxide reactant and a maleic anhydride in the presence of a non polar solvent or in the substantial absence of a solvent. When this embodiment is employed, the product is an alternating polymer -A-D-A-D-A-D-, wherein D is a unit obtained by 1,2- or 1,5-propagation of the butadiene monoepoxide reactant and A is a unit from the maleic anhydride reactant. However, when the polymerization is conducted in the absence of a polar solvent by using a non polar solvent or no added solvent, the product may have chains of alternating units as illustrated above linked by a dimer formed from the butadiene monoxide reactant. The dimer has the formula:

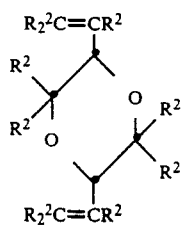

and the bridging unit derived from the dimer has the formula:

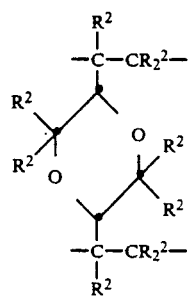

wherein $R^2$ and the total number of carbon atoms in $R^2$ groups are as defined above.

This invention has been described above with particular reference to preferred embodiments. A skilled practitioner, familiar with the above-detailed description, can make many modifications and substitutions without departing from the scope and spirit of the appended claims.

We claim:

1. Process for the preparation of a polymer comprising reacting a butadiene monoepoxide and a maleic anhydride, each having up to about 12 carbon atoms and a dioxolane having the formula:

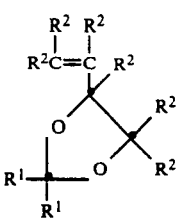

wherein $R^2$ is selected from hydrogen and alkyl groups having up to about 4 carbon atoms, and each $R^1$ is an alkyl group or aryl group of up to about 10 carbon atoms, or when taken together are a divalent alkyl or aryl group of up to about 20 carbon atoms, said process being conducted in the presence of a free radical initiating amount of a free radical initiator, and at a temperature from about $-10°$ C. to about $180°$ C.

2. A process of claim 1, said process comprising reacting a maleic anhydride reactant and a butadiene monoepoxide reactant, each having up to about 12 carbon atoms in the presence of a free radical initiating quantity of a free radical initiator, and in the substantial absence of a polar solvent, at a temperature within the range of from $-10°$ C. to about $180°$ C., said process being further characterized by being conducted in the presence of a non polar solvent, or in the absence of added solvent.

* * * * *